US008645502B2

(12) United States Patent
Dash

(10) Patent No.: US 8,645,502 B2
(45) Date of Patent: Feb. 4, 2014

(54) DYNAMIC INTERFACE TO READ DATABASE THROUGH REMOTE PROCEDURE CALL

(75) Inventor: Ajit Dash, Cupertino, CA (US)

(73) Assignee: Business Objects Software Limited, Dublin (IE)

(*) Notice: Subject to any disclaimer, the term of this patent is extended or adjusted under 35 U.S.C. 154(b) by 112 days.

(21) Appl. No.: 13/288,851

(22) Filed: Nov. 3, 2011

(65) Prior Publication Data
US 2013/0117414 A1 May 9, 2013

(51) Int. Cl.
G06F 15/16 (2006.01)

(52) U.S. Cl.
USPC .......................................................... 709/219

(58) Field of Classification Search
None
See application file for complete search history.

(56) References Cited

U.S. PATENT DOCUMENTS

| | | | |
|---|---|---|---|
| 6,266,666 B1 * | 7/2001 | Ireland et al. ................. | 707/770 |
| 6,591,272 B1 | 7/2003 | Williams | |
| 6,799,166 B2 * | 9/2004 | Dorrance et al. ............... | 705/35 |
| 7,272,600 B1 * | 9/2007 | Singh .................................... | 1/1 |
| 7,917,629 B2 * | 3/2011 | Werner ......................... | 709/227 |
| 2007/0299936 A1 | 12/2007 | Borgendale et al. | |
| 2010/0064129 A1 * | 3/2010 | Honjo et al. ................... | 713/150 |
| 2011/0179429 A1 * | 7/2011 | Bertin et al. .................. | 719/330 |

OTHER PUBLICATIONS www.saptechies.com/what-is-difference-between-open-sql-native-sql/ Mar. 28, 2008.
International Search Report (from a corresponding foreign application), EP 12007448.9, mailed Jan. 24, 2013.

* cited by examiner

Primary Examiner — Joshua Joo
Assistant Examiner — Younes Naji
(74) Attorney, Agent, or Firm — Fountainhead Law Group PC

(57) ABSTRACT

Data read from a database may be transferred to an external system utilizing a dynamic interface, through a remote procedure call (RPC) communication mechanism. In particular embodiments within the SAP environment, data is transferred utilizing an executable program in a high level language such as Advanced Business Application Programming (ABAP). Data may be streamed from the ABAP executable program directly to a Data Services Job engine via a NetWeaver remote function call (NWRFC) C/C++ connector.

15 Claims, 5 Drawing Sheets

DYNAMIC INTERFACE TO READ DATABASE THROUGH REMOTE PROCEDURE CALL

BACKGROUND

The present invention relates to storage of data in databases, and in particular, to a dynamic interface for accessing information from a database.

Unless otherwise indicated herein, the approaches described in this section are not prior art to the claims in this application and are not admitted to be prior art by inclusion in this section.

Databases comprising rows and columns are highly useful tools allowing users to manage complex relationships between different types of data. In general, a database is created in a lower level code such as structured query language (SQL), and stored on a server. A user (typically at a remote client) accesses this data through a data services engine running a higher level language that provides a high level of abstraction from the basic database level. One example of such a higher level language is the Advanced Business Application Programming (ABAP) language of SAP AG.

FIG. 1 is a block diagram illustrating a highly simplified process flow 100 of a user posing a request for information from a database. In a first step, a human user 102 designs an extraction dataflow 104 using the data services designer 106 of a data services client 107. Herein, the extraction dataflow designed by a user in the context of a SAP system, is referred to herein as the ABAP Dataflow. However, the present invention is not limited to a SAP system, and could relate to other higher level languages used to interact with databases created in lower level languages.

Design of the extraction dataflow comprises specifying: i) the Source object(s) 104a, ii) the extraction transformations 104b, and iii) the structure of the output data table 104c. The specific structure of the output table is also referred to herein as the schema.

In a second step, the particular extraction dataflow designed by the user, is saved in a computer readable storage medium 108 that is in communication with the data services engine. While in this particular drawing, the computer readable storage medium is shown as part of the data services client, this is not required and the computer readable storage medium could be accessed remotely by the data services client through a computer network.

In a third step, a higher level language report 110 is generated by the data services designer based upon the extraction dataflow specified by the user. In a fourth step, the higher level language report 110 is communicated from the data services client through a remote function call connection 112 to the database application server 114, where it is processed by processor 115 and stored in repository 116 for processing to return the database information desired by the user.

Specifically, the processor of the application server interrogates the database in the low level language, and returns information relevant to the higher level language report 110 and the extraction dataflow present therein. In the particular context of a SAP system, an ABAP executable program writes a result to SAP Application Server file system.

Conventionally, this information returned from the database may be communicated back to the user at the client as shown in FIG. 2. This figure shows a simplified block diagram of a method 200 of data extraction from a SAP system.

In a first step 201, the data services engine 204 accesses the ABAP dataflow specification from the computer-readable storage medium in which it was previously saved. The data services engine retrieves ABAP report name from ABAP dataflow specification, and submits an ABAP job to execute the ABAP report.

The ABAP dataflow establishes a remote function call connection 205 to the SAP application server 206 using the NetWeaver Remote Function Call (RFC) Library 208 of the Data Services Engine 204. A submit batch job for the ABAP report communicated from the data services engine to the SAP application server includes the following pieces of information:
  Dataflow parameters
  SAP Application Server Local Directory
  Data file name.

In a second step 202, the dialog work process 208 of the SAP Application server 206 receives the batch job request through the gateway 210. This batch job includes the ABAP report including the above information.

In a third step 203, the batch work process 212 causes the ABAP report to execute a query to extract data from the source object pursuant to the dataflow. An ABAP internal table is created to load data from the extractor source object.

For each iteration of a data packet, the ABAP report writes 205 to the local file of the directory of the SAP application server host file system 213 specified as parameter. The data is converted to character format in order to write to the local file. The ABAP report then exits after writing the data to the local file.

In a fourth step 207, the data services engine monitors the dispatcher of the application server to detect when the batch job has finished. According to this conventional approach, the Data Services engine remains idle for the period of time that the ABAP report writes data to the local file. The idleness of the Data Services engine is attributable to at least two possible reasons.

First, data will be in inconsistent state when ABAP report is writing data in batches to a specified local file. During this period, if the Data Services engine (in step 207) reads the data from the specified file and process, then the result will be inconsistent. Hence the Data Services engine waits for step 203 to be completed.

A second reason is that when step 207 writes data to an operating system (OS) file, it may have held write lock. For some operating systems, it may not be possible to read data.

In a fifth step 209, when Data Services engine detects that the ABAP report has finished its execution, it connects to SAP Application Server host 206 through an operating system call 214. In a sixth step 211, the Data Services engine transfers the data to its local directory using its host file system 216. Conventionally, this transfer of data may be accomplished using either a shared directory copy, a file transfer protocol (FTP), or a third-party file transfer software.

In a seventh step 217, the data services engine reads the data from its local file, and processes the data. The retrieved data may then be displayed to the user from the data services engine.

While effective, the conventional approach for reading data from the application server may raise certain issues. For example, the conventional approach to transferring information may create large files that occupy space in the file system of the host application server. Moreover, accessing this information stored locally at the application server may consume processing resources by incurring input/output from the disk, delaying processing performance.

Another issue is that a user must specify in advance, the local file of the application server to which data of the report is to be written. This requires the user have knowledge and familiarity of the file system of a host application server, which he or she may not possess.

Still another issue is that in conventional approaches, the ABAP report reads the data from the internal table and converts the data to character format before writing as a delimited record. In doing so, the designer identifies a particular character for the local file which is not part of the data, and which can be used as delimiter (column and row). Thus under conventional read approaches, in designing ABAP dataflow the designer needs to recognize possible characters that can be extracted as part of dataset. The designer comes up with special characters (as delimiters) which are not part of dataset in order to separate data into columns and records. This can be a difficult task where a user is unfamiliar with the file system (and characters used) of a remote host application server.

Security is another possible issue raised by this conventional approach for transferring data. In particular, owing to security reasons it may be impractical to open a FTP port or a shared directory between the client and server. The system host and the data services engine host may also be located in separate network areas.

The present disclosure addresses these and other issues with systems and methods for implementing a dynamic interface allowing an external system to read data from a database through a unique remote function call (RFC) session.

SUMMARY

According to certain embodiments, data read from a database may be transferred to an external system utilizing a dynamic interface, through a remote procedure call (RPC) communication mechanism. In particular embodiments within the SAP environment, data is transferred utilizing an executable program in a high level language such as the Advanced Business Application Programming (ABAP) language. Data may be streamed from the ABAP executable program directly to a Data Services Job engine via a NetWeaver remote function call (NWRFC) C/C++ connector.

An embodiment of a computer-implemented method comprises:

providing in a non-transitory computer readable storage medium of an application server, a database created in an application level language and comprising data organized in rows and columns;

executing a program in a high level language in the application server to retrieve selected data from the database according to an output table structure of a dataflow designed by a user; and streaming the selected data from the application server to a data services engine via a remote procedure call (RPC) connector.

An embodiment of a non-transitory computer readable storage medium stores a computer program for performing a method, said method comprising:

executing a program in a high level language in an application server to retrieve selected data from a database stored in the application server in an application level language, the program configured to retrieve the selected data according to an output table structure of a dataflow designed by a user; and streaming the selected data from the application server to a data services engine via a remote procedure call (RPC) connector.

An embodiment of a computer system comprises one or more processors and a software program executable in a high level language on said computer system, the software program configured to:

retrieve selected data from a database stored in an application level language in an application server, the program configured to retrieve the selected data according to an output table structure of a dataflow designed by a user; and stream the selected data from the application server to a data services engine via a remote procedure call (RPC) connector.

In certain embodiments, the selected data may be streamed to the data services engine in batches of data packets, such that the data services engine performs other processing while the program is preparing a next batch of data packets.

In certain embodiments, the data services engine references the output table structure to create a corresponding remote procedure call (RPC) table structure, the data services engine creates a RPC function identified by a unique name, the data services engine adds the RPC table structure as a parameter to the RPC function, and the application server streams the selected data to the data services engine based upon the unique name and a unique communication object configured in the application server.

In certain embodiments a single character flag is added to the RPC function as an export parameter indicating an end of the batch of data packets.

In certain embodiments the retrieved data is streamed according to a native RPC data serialization.

In certain embodiments the RPC connector comprises a NetWeaver remote function call (NWRFC) C/C++ connector.

The following detailed description and accompanying drawings provide a better understanding of the nature and advantages of embodiments of the present invention.

DETAILED DESCRIPTION

Figure 3:
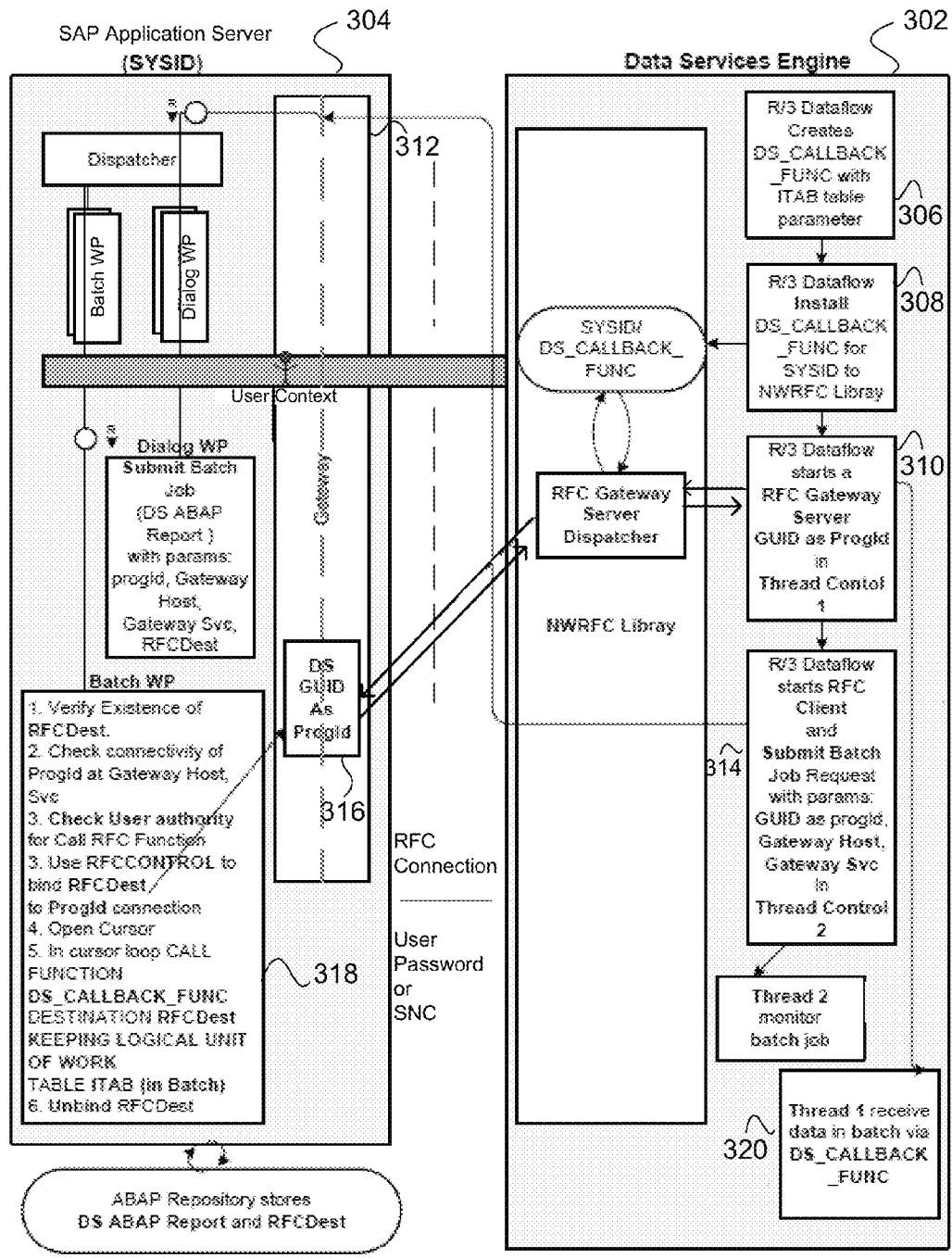
FIG. 3 is a simplified block diagram showing the interaction between a data services engine and an application server according to an embodiment.

Described herein are techniques for communicating to an external system, data that has been read from a database. FIG. 3 is a simplified block diagram showing the interaction 300 between a data services engine 302 and an application server 304 according to an embodiment. The particular embodiment of FIG. 3 relates to a SAP system, but it will be understood that concepts disclosed herein can be applied to other database systems.

Figure 1:
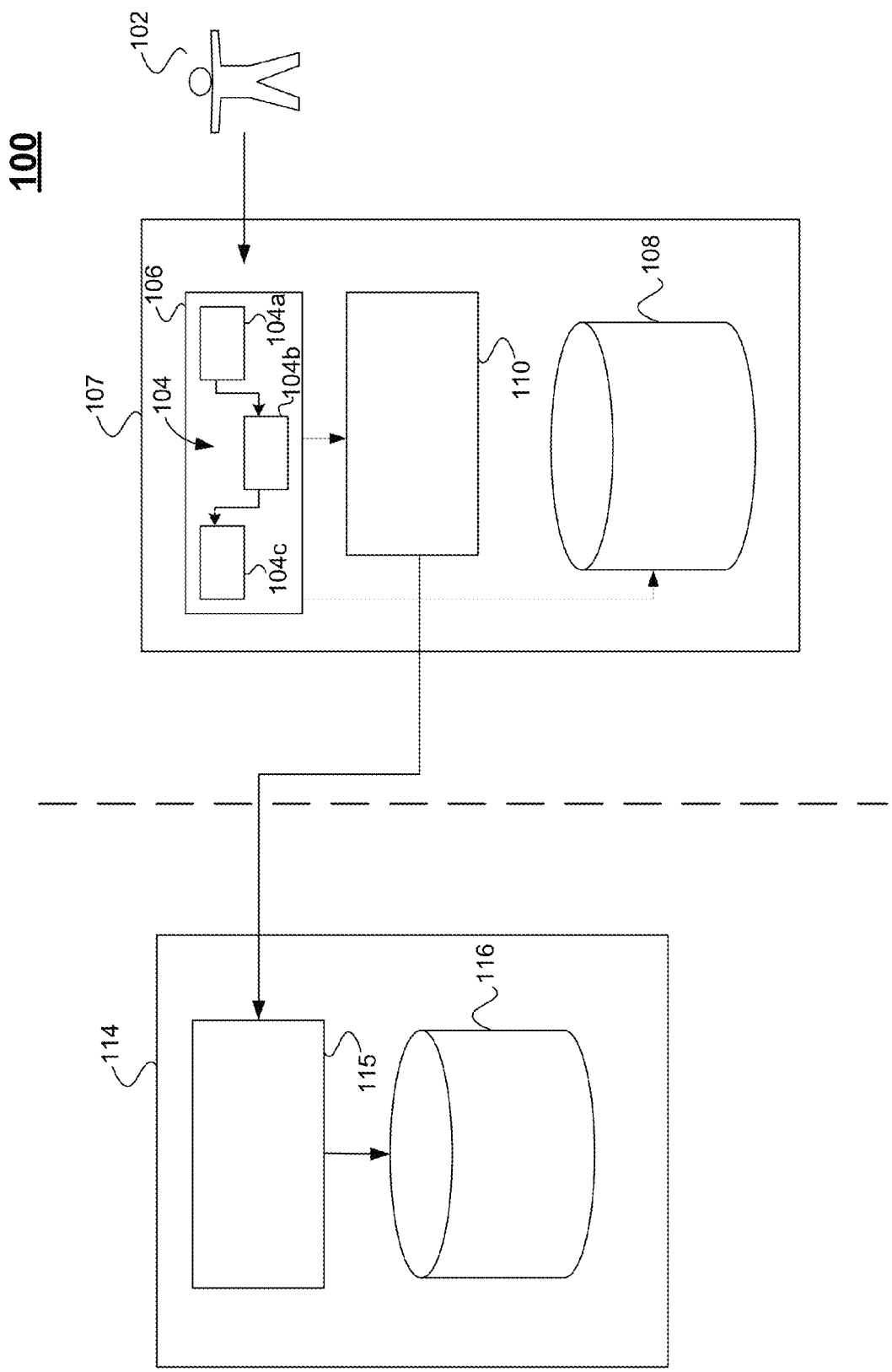
FIG. 1 is a simplified block diagram showing the interaction between a user, a data services designer, and an application server, to pose a query to a database.
Figure 2:
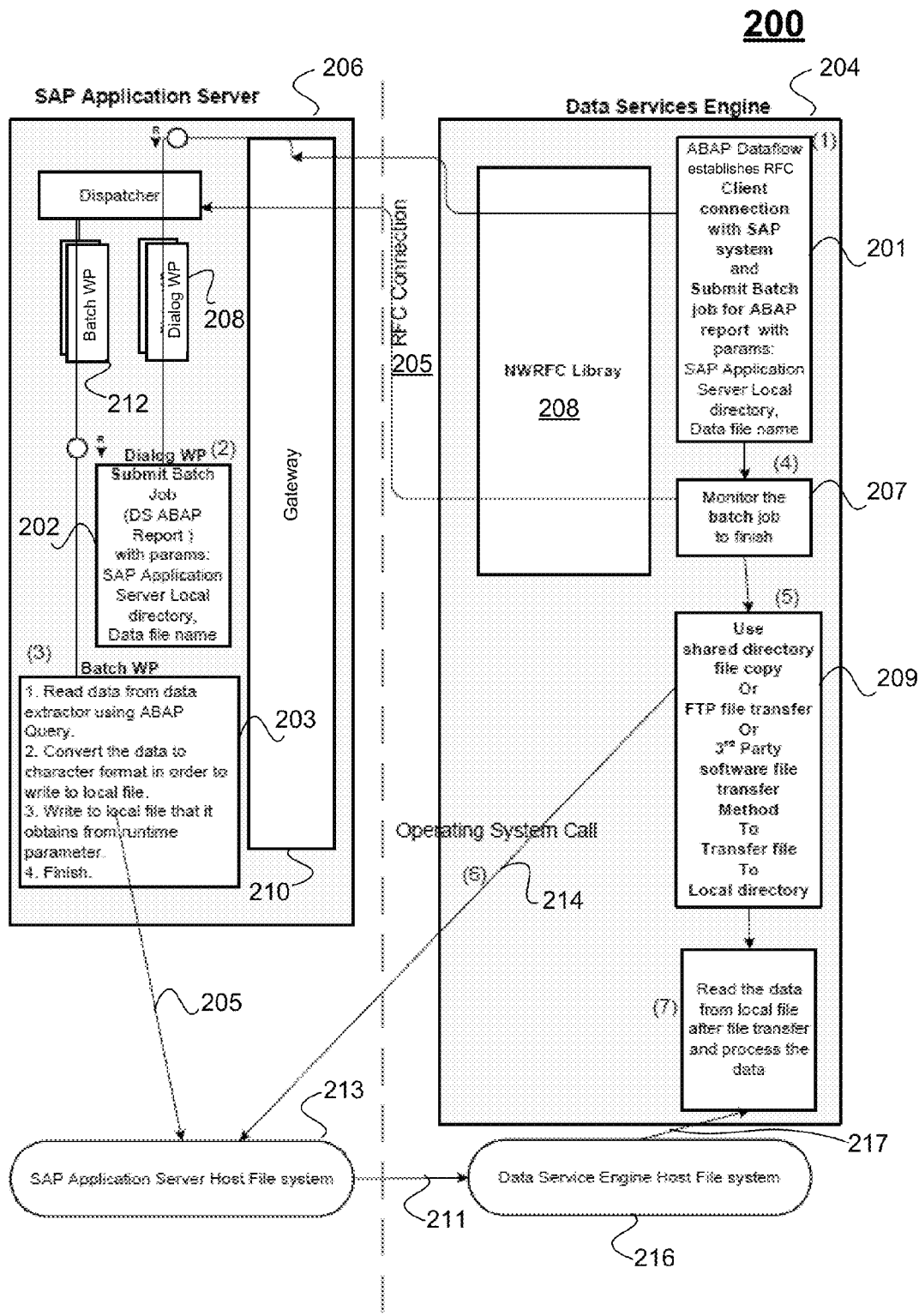
FIG. 2 is a simplified block diagram showing the interaction between a data services engine and an application server according to a conventional approach for returning information in response to a query.

In a first step 306 the data services engine reads the ABAP dataflow specification from the computer-readable storage medium in which it was previously saved, as has been previously described above in connection with FIG. 1. The data services engine retrieves the ABAP report name from the ABAP dataflow specification.

The data services engine then uses the output table structure (schema) retrieved from the dataflow specification, to create in its memory a corresponding remote procedure call (RPC) table structure. In the specific SAP environment illustrated in connection with this particular embodiment, a RPC is referred to as a Remote Function Call (RFC), and the RFC table structure is represented by ITAB. However, the present invention is not limited to the SAP environment, and it will be understood that as used herein the term RFC refers to one particular implementation of a RPC.

This table structure matches the schema of the ABAP report. The data services engine then creates a RFC function, and adds the previously created RFC table structure (ITAB) as a parameter to the RFC function.

This RFC function is given a unique name (here DS_CALLBACK_FUNC). In addition to the table structure parameter, a single character flag is added as an export parameter which will indicate end of data batch stream.

In a second step 308, after constructing this in-memory RFC function object, the data services engine stores this function in the NetWeaver RFC library 309, identified by the function's unique name. In this manner, a RFC remote function is created whose table parameter structure matches the structure of the ABAP report's output table.

An advantage of having such a dynamic RFC function, is that its scope is the data services engine's process memory. It is not stored in any permanent repository. Accordingly, changes to ABAP report's output structure do not have to be synchronized with a permanent RFC function stored object.

In a third step 310, the data services engine makes a RFC server connection to the Gateway Server 312 of the application server 304, using global unique identifier (here ProgramId or "ProgId"). Such global unique identifier helps job instance of ABAP report to establish a unique session with its corresponding process in the data services engine, via the SAP Gateway Server.

Such an approach may be contrasted with conventional methods, wherein the application server connects via its Gateway Server, to external server cluster (comprising many servers running in a cluster) identified by a common ProgramId. In that case, the SAP Gateway Server chooses one among the cluster servers to communicate.

In a fourth step 314, the data services engine makes a client connection to the application server using the NWRFC library. The data services engine retrieves the ABAP report name from the ABAP dataflow specification previously designed by the user (FIG. 1), and submits an ABAP job to the application server to execute the ABAP report. In doing so, the data services engine passes following parameters to the ABAP report:
  the SAP Gateway host the data services engine's RFC Server connection is connected to;
  the SAP Gateway Server TCP/IP port number;
  the RFC TCP/IP destination name (specified by the user in FIG. 1);
  the Data Packet size; and
  the RFC Function name.

In a fifth step 316, the ABAP Report establishes unique RFC session with Data Services engine via SAP Gateway Server using the SAP Gateway Host and its TCP/IP port the Data Services RFC Server is connected to, together with the following pieces of information:
1) the unique ProgramId received from the data services engine; and
2) a communication object (here RFC Destination), that a user configures in the application server (for example using transaction sm59).

Conventionally, a user specifies an external server's ProgramId while creating the RFC TCP/IP destination using transaction sm59, which is saved into a repository of the application server. The SAP system establishes a session with the external server process which identifies itself to the SAP Gateway Server as configured by the saved ProgramId.

By contrast, embodiments of the present invention may employ a unique ProgramId that is generated during runtime by data services engine. This ProgramId is not required to be saved as a registered ProgramId in RFC Destination. This allows a same RFC Destination to be used to dynamically to connect to different unique registered external server programs (represented here by ProgramId) during report execution. A configured RFC Destination is employed because the user can configure other connection session protocols, such as Secured Network Communication (SNC) parameters, Communication character language (e.g. Unicode, Japanese etc.) and other communication parameters.

In a sixth step 318, the ABAP report creates ABAP internal table to load data from extractor source object. The ABAP report executes the query in order to extract data from the source object.

For each iteration of Data Packet, ABAP report calls the RFC function of the in-memory repository of the data services engine, specifying RFC Destination as destination. Since unique connection session is already established, the RFC protocol knows how to push the data to the data services engine.

While calling the RFC function the ABAP report passes the ABAP internal table object previously created, as an actual table parameter to RFC function. The RFC protocol obtains RFC function metadata from the data services engine in-memory repository, in order to correctly serialize the data. A potential advantage of this approach is that the ABAP report need not be concerned with data packet serialization, data transmission, and data packet de-serialization, as the RFC protocol takes care of the data transmission part.

In a seventh step 320, the data services engine receives data packets in batch via the uniquely identified RFC function. The ABAP report does not need to worry about data serialization, as is the case in conventional approaches involving communicating through a data file. According to certain embodiments, a native RFC data serialization may be used to transfer data to the NetWeaver RFC library.

ABAP report indicates the last data packet by setting the last batch parameter to true in RFC function.

Embodiments of the present invention employing data transfer utilizing a remote function call (RFC) approach, may offer one or more potential benefits. One such potential benefit is that data transfer does not consume memory or processing time of the file system of the host of the application server.

Moreover, in utilizing data transfer according to the RFC mechanism, data is transferred to the data services engine packet by packet (one packet comprising a specified number of data records), in batch. In this manner a consistent batch of data records is pushed to Data Services engine. Data Services engine thus does not have to guess when a consistent batch of data records is ready to process. So while a next batch of data records is being extracted, the Data Services engine is processing received batch of data records. This is a faster technique, improving overall performance by allowing the data services engine to process data while the ABAP report is extracting the next set of data, and transforming that data to create another data packet.

Another potential advantage is that the NetWeaver RFC supports communicating across a subnet via SAP router. Moreover, because the NetWeaver RFC connector supports Secured Network Communication (SNC), data can be transferred to the data services engine in a secure manner.

Finally, since communication takes place between the NetWeaver RFC and the SAP application server, this data transfer technique may take advantage of the NetWeaver RFC Unicode support to deliver data in UTF16 encoding. Such UTF16 encoded character data is relatively easy to process in memory and carry data from different languages.

Figure 5:
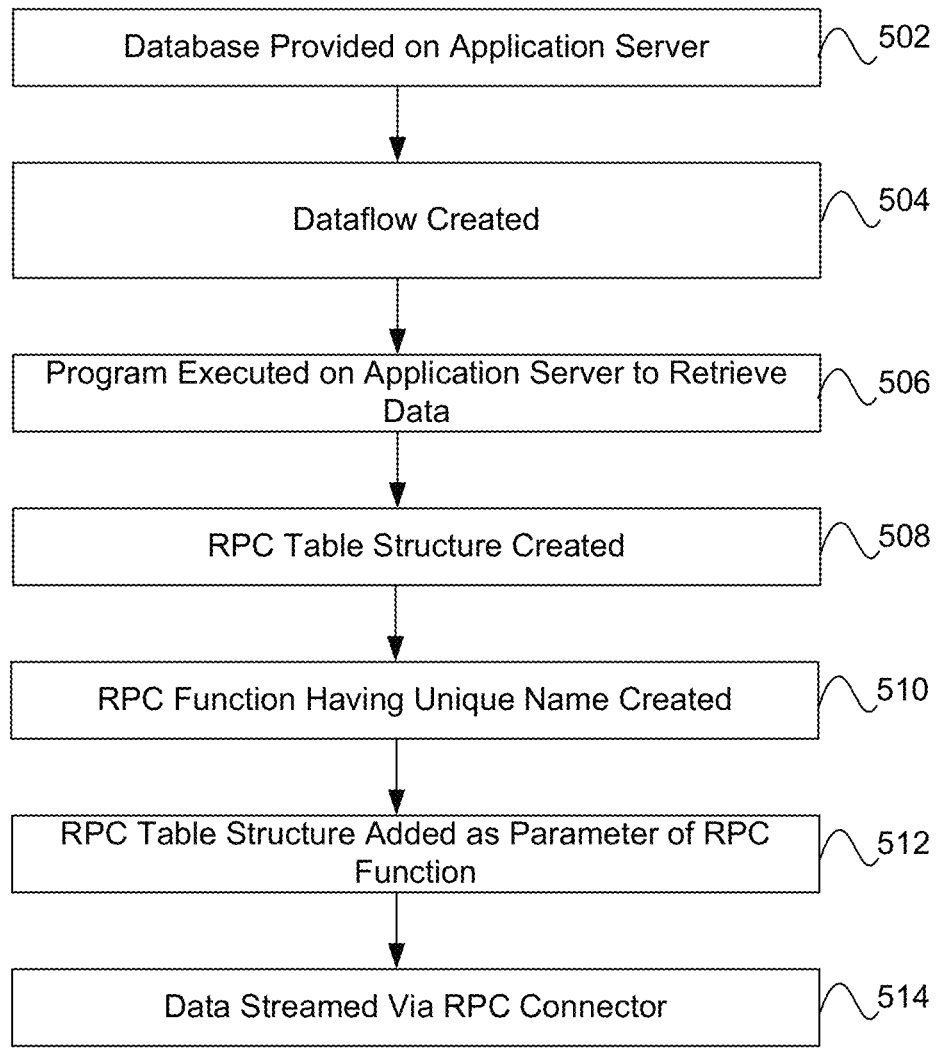
FIG. 5 shows a simplified process flow.

FIG. 5 provides a simplified view of the steps of a process flow 500 for reading data from a database according to one embodiment. In a first step 502, a database created in an application level language is provided on an application server. In a second step 504, a dataflow including an output table structure is stored on a data services designer. In a third step 506, a program is executed in a high level language on the application server to retrieve selected data according to the output table structure. In a fourth step 508, the data services designer references the output table structure to create a corresponding remote procedure call (RPC) table structure. In a fifth step 510, the data services designer creates a RPC function identified by a unique name. In a sixth step 512 the data services designer adds the RPC table structure as a parameter to the RPC function. In a seventh step 512, the application server streams the selected data to the data services designer via a RPC connector based upon the unique name and a unique communication object configured in the application server.

The apparatuses, methods, and techniques described herein may be implemented as a computer program (software) executing on one or more computers. The computer program may further be stored on a non-transitory computer readable medium. The non-transitory computer readable medium may include instructions for performing the processes described.

In the following description, for purposes of explanation, examples and specific details are set forth in order to provide a thorough understanding of various embodiments. It will be evident, however, to one skilled in the art that the present invention as defined by the claims may include some or all of the features in these examples alone or in combination with other features described below, and may further include modifications and equivalents of the features and concepts described herein.

The computer system may comprise a software server. A number of software servers together may form a cluster, or logical network of computer systems programmed with software programs that communicate with each other and work together to process requests.

Figure 4:
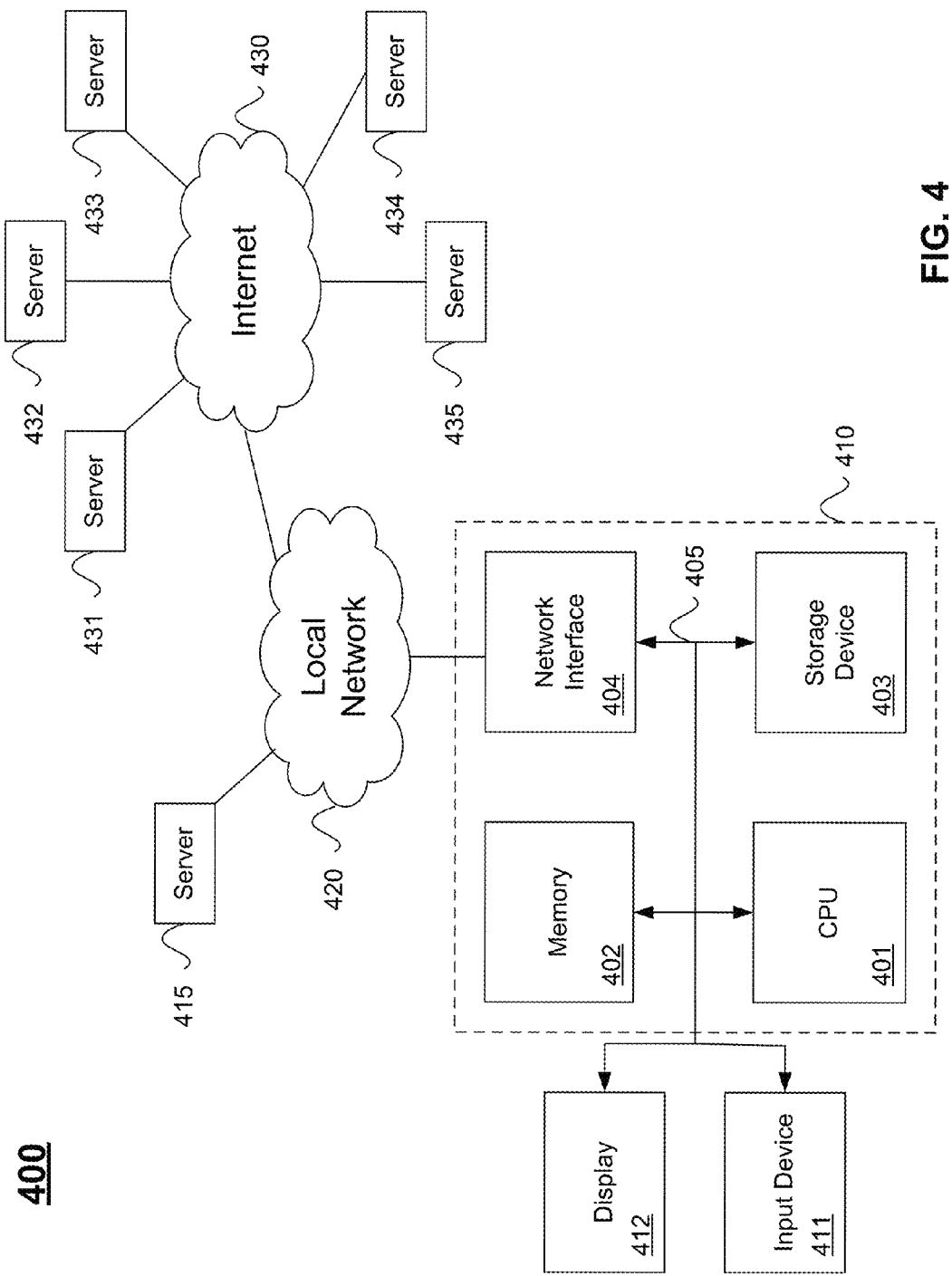
FIG. 4 shows an example of a computer system.

An example computer system 410 is illustrated in FIG. 4. Computer system 410 includes a bus 405 or other communication mechanism for communicating information, and a processor 401 coupled with bus 405 for processing information.

Computer system 410 also includes a memory 402 coupled to bus 405 for storing information and instructions to be executed by processor 401, including information and instructions for performing the techniques described above, for example. This memory may also be used for storing variables or other intermediate information during execution of instructions to be executed by processor 401. Possible implementations of this memory may be, but are not limited to, random access memory (RAM), read only memory (ROM), or both.

A storage device 403 is also provided for storing information and instructions. Common forms of storage devices include, for example, a hard drive, a magnetic disk, an optical disk, a CD-ROM, a DVD, a flash memory, a USB memory card, or any other medium from which a computer can read.

Storage device 403 may include source code, binary code, or software files for performing the techniques above, for example. Storage device and memory are both examples of computer readable media.

Computer system 410 may be coupled via bus 405 to a display 412, such as a cathode ray tube (CRT) or liquid crystal display (LCD), for displaying information to a computer user. An input device 411 such as a keyboard and/or mouse is coupled to bus 405 for communicating information and command selections from the user to processor 401. The combination of these components allows the user to communicate with the system. In some systems, bus 405 may be divided into multiple specialized buses.

Computer system 410 also includes a network interface 804 coupled with bus 805. Network interface 404 may provide two-way data communication between computer system 410 and the local network 420. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 410 can send and receive information, including messages or other interface actions, through the network interface 404 across a local network 420, an Intranet, or the Internet 430. For a local network, computer system 410 may communicate with a plurality of other computer machines, such as server 415. Accordingly, computer system 410 and server computer systems represented by server 415 may form a cloud computing network, which may be programmed with processes described herein.

In an example involving the Internet, software components or services may reside on multiple different computer systems 410 or servers 431-435 across the network. The processes described above may be implemented on one or more servers, for example. A server 431 may transmit actions or messages from one component, through Internet 430, local network 420, and network interface 404 to a component on computer system 410. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
providing a registered external server program including a data services engine;
causing the data services engine to reference an output table structure of a dataflow designed by user, to create a corresponding remote procedure call (RPC) table structure;

causing the data services engine to create an RPC function identified by a unique name, the RPC function also specifying,
the RPC table structure,
a flag added to the RPC function as an export parameter indicating an end of batches of data packets, and
a destination of the data services engine;
providing in a non-transitory computer readable storage medium of an application server, a database created in an application level language and comprising data organized in rows and columns;
causing the data services engine to make an RPC server connector to the application server using the unique name; and
executing a program in a high level language in the application server to retrieve selected data from the database according to the output table structure; and
streaming the selected data from the application server to the data services engine via the remote procedure call (RPC) connector, wherein the application server streams the selected data in the batches to the destination based upon the unique name, thereby dynamically connecting the registered external server program to report the selected data in the output table structure in the batches.

2. The computer-implemented method of claim 1 wherein the selected data is streamed to the data services engine in batches of data packets prepared by a cursor loop call function, such that the data services engine performs other processing while the cursor loop call function is preparing a next batch of data packets.

3. The computer-implemented method of claim 2 wherein the flag is a single character flag.

4. The computer-implemented method of claim 1 wherein the retrieved data is streamed according to a native RPC data serialization.

5. The computer-implemented method of claim 1 wherein the RPC connector comprises a NetWeaver remote function call (NWRFC) C/C++ connector.

6. A non-transitory computer readable storage medium embodying a computer program for performing a method, said method comprising:
providing a registered external server program including a data services engine;
causing the data services engine to reference an output table structure of a dataflow designed by user, to create a corresponding remote procedure call (RPC) table structure;
causing the data services engine to create an RPC function identified by a unique name, the RPC function also specifying,
the RPC table structure,
a flag added to the RPC function as an export parameter indicating an end of batches of data packets, and
a destination of the data services engine;
causing the data services engine to make an RPC server connector to the application server using the unique name;
executing a program in a high level language in an application server to retrieve selected data from a database stored in the application server in an application level language, the program configured to retrieve the selected data according to the output table structure; and
streaming the selected data from the application server to the data services engine via the remote procedure call (RPC) connector, wherein the application server streams the selected data in the batches to the destination based upon the unique name, thereby dynamically connecting the registered external server program to report the selected data in the output table structure in the batches.

7. The non-transitory computer readable storage medium of claim 6 wherein the selected data is streamed to the data services engine in the batches of data packets prepared by a cursor loop call function, such that the data services engine performs other processing while the cursor loop call function is preparing a next batch of data packets.

8. The non-transitory computer readable storage medium of claim 7 wherein the flag is a single character flag.

9. The non-transitory computer readable storage medium of claim 6 wherein the retrieved data is streamed according to a native RPC data serialization.

10. The non-transitory computer readable storage medium of claim 6 wherein the RPC connector comprises a NetWeaver remote function call (NWRFC) C/C++ connector.

11. A computer system comprising:
one or more processors;
a software program, executable in a high level language on said computer system, the software program configured to:
provide a registered external server program including a data services engine;
cause the data services engine to reference an output table structure of a dataflow designed by user, to create a corresponding remote procedure call (RPC) table structure;
cause the data services engine to create an RPC function identified by a unique name, the RPC function also specifying,
the RPC table structure,
a flag added to the RPC function as an export parameter indicating an end of batches of data packets, and
a destination of the data services engine;
cause the data services engine to make an RPC server connector to the application server using the unique name;
cause retrieval of selected data from a database stored in an application level language in an application server, the program configured to retrieve the selected data according to the output table structure; and
stream the selected data from the application server to the data services engine via the remote procedure call (RPC) connector, wherein the application server streams the selected data in the batches to the destination based upon the unique name, thereby dynamically connecting the registered external server program to report the selected data in the output table structure in the batches.

12. The computer system of claim 11 wherein the software program is configured to stream the selected data to the data services engine in batches of data packets prepared by a cursor loop function, such that the data services engine performs other processing while the cursor loop function is preparing a next batch of data packets.

13. The computer system of claim 11 wherein the flag is a single character flag.

14. The computer system of claim 11 wherein the software program is configured to stream the selected data according to a native RPC data serialization.

15. The computer system of claim 11 wherein the software program is configured to stream the selected data via a NetWeaver remote function call (NWRFC) C/C++ connector.

* * * * *